(12) United States Patent
Lee et al.

(10) Patent No.: US 8,929,306 B2
(45) Date of Patent: Jan. 6, 2015

(54) NAS-BASED SIGNALING PROTOCOL FOR OVERLOAD PROTECTION OF RANDOM ACCESS IN MASSIVE MACHINE TYPE COMMUNICATION

(75) Inventors: Kidong Lee, San Diego, CA (US); Sanggook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 13/114,624

(22) Filed: May 24, 2011

(65) Prior Publication Data
US 2011/0292893 A1 Dec. 1, 2011

Related U.S. Application Data

(60) Provisional application No. 61/348,684, filed on May 26, 2010.

(51) Int. Cl.
*H04W 72/04* (2009.01)
*H04W 74/00* (2009.01)
*H04W 4/00* (2009.01)
*H04W 4/08* (2009.01)
*H04W 74/08* (2009.01)

(52) U.S. Cl.
CPC ............ *H04W 74/002* (2013.01); *H04W 4/001* (2013.01); *H04W 4/005* (2013.01); *H04W 4/08* (2013.01); *H04W 74/0833* (2013.01)

USPC .......................................................... 370/329

(58) Field of Classification Search
CPC ........ H04W 4/001; H04W 4/005; H04W 4/08; H04W 74/002; H04W 74/0833
USPC .................................. 370/328–332; 455/411
See application file for complete search history.

(56) References Cited

U.S. PATENT DOCUMENTS

| | | | |
|---|---|---|---|
| 2001/0037472 A1* | 11/2001 | Li | 714/4 |
| 2008/0310378 A1* | 12/2008 | Kitazoe et al. | 370/338 |
| 2010/0112981 A1* | 5/2010 | Suh et al. | 455/411 |
| 2010/0272020 A1 | 10/2010 | Norp et al. | |
| 2010/0272048 A1 | 10/2010 | Pan et al. | |
| 2010/0303039 A1* | 12/2010 | Zhang et al. | 370/331 |
| 2011/0199905 A1* | 8/2011 | Pinheiro et al. | 370/235 |
| 2012/0030358 A1* | 2/2012 | MacKenzie | 709/226 |

* cited by examiner

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

A scheme of minimizing the random access load on the network to support MTC or M2M devices is provided. In particular, the concept of grouping (e.g., collecting, combining, aggregating, etc.) MTC or M2M devices based on non-access stratus (NAS) signaling is performed. Doing so results in reduced the random access load on the network such that a large number of MTC or M2M devices can be accommodated.

16 Claims, 8 Drawing Sheets

| PRACH Configuration Index | % resources consumed in a 5MHz bandwidth | Number of RACH opportunities/s/preamble |
|---|---|---|
| 0 | 2.5 | 100 |
| 6 | 5 | 200 |
| 9 | 7.5 | 300 |
| 12 | 12.5 | 500 |
| 14 | 25 | 1000 |

| Use Cases | Details |
|---|---|
| Metering | Power, Gas, Water, Heating, Grid control |
| Security | Alarm systems, Backup for landline<br>Access control, Car/driver security |
| Remote Maintenance/Control | Sensors, Lighting, Pumps, Valves, Elevator control, Vending machine control, Vehicle diagnosis |
| Tracking & Tracing | Fleet management, Order Management<br>Asset Tracking, Traffic information<br>Road tolling, Traffic optimisation/steering |
| Payment | Pont of sales, Vending machines<br>Loyalty concepts, Gaming machines |
| Health | Monitoring vital signs, Remote diagnostics<br>Supporting the aged or handicapped<br>Webb Access Telemedicine points |

FIG. 10

NAS-BASED SIGNALING PROTOCOL FOR OVERLOAD PROTECTION OF RANDOM ACCESS IN MASSIVE MACHINE TYPE COMMUNICATION

CROSS-REFERENCE

The present disclosure claims priority benefit to the following applications, which contents are all incorporated by reference herein: U.S. Provisional Application No. 61/348,684 (filed May 26, 2010).

BACKGROUND

In the related art, certain procedures related to machine type communication (MTC) or machine-to-machine (M2M) communication were problematic due to complicated calculations and overall processing burden. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that certain procedures related to machine type communication (MTC) or machine-to-machine (M2M) communication are more efficiently and effectively performed. In particular, the random access load on the network can be minimized by employing particular methods for grouping MTC or M2M devices based on non-access stratus (NAS) signaling as described herein.

DETAILED DESCRIPTION

The inventive concepts and features described herein are generally explained in terms of machine type communication (MTC) or machine-to-machine (M2M) communication in 3GPP technology. However, such details are not meant to limit the various features described herein, which are applicable to other types of mobile and/or wireless (radio) communication systems and methods that comply with various types of standards.

The present inventors recognized that conventional network load minimizing methods could be improved. It is important to note that such problem recognition was based upon concentrated investigation, rigorous simulations, and experimental testing conducted by the present inventors. As a result, the present inventors have provided a method of minimizing the random access load on the network to support MTC or M2M devices. In particular, the concept of grouping MTC or M2M devices based on non-access stratus (NAS) signaling has never been provided or suggested in any known technique prior to the work done by the present inventors as described in this disclosure and in the priority document disclosures.

The term "Machine-to-Machine" (M2M), which is also referred to as machine-type communications (MTC), is used to describe various types of technologies that allow wireless and wired (or hybrid) systems to communicate with other devices that have the same (or similar) capabilities. M2M uses a device (e.g., sensor, meter, etc.) to capture or detect some sort of event (e.g., temperature, inventory level, etc.), which is transferred through a network to an application (software program) that translates the captured event into meaningful information. For example, the result of an M2M (MTC) service may inform a store manager that items need to be restocked. Such M2M (MTC) services can be accomplished through the use of telemetry, which is the language that machines use when in communication with each other.

Recently, SMS (Short Messaging Services) can be used as the transmission medium for M2M communication. Developments in direct signaling (Signaling System 7: SS7) via SMS gateways have increased the reliability of M2M communications. Technologies for connecting M2M networks with consumer electronics can improve the speed, connectivity and usefulness of M2M devices that are being implemented for various practical situations. Also, so-called "smart cards" or other types of SIM (Subscriber Identity Module) cards and USIM cards that can be implemented into mobile phones, smart phones, tablet computers, and various other wireless communications devices can have M2M applications and support. Other applications can include M2M being implemented together with RFID (Radio Frequency Identification) technology, M2M being applied to the automobile industry to improve driver safety, M2M cooperating with satellite tracking systems and satellite communications for commercial applications and security monitoring, and the like. There are so-called "open M2M initiatives" such as BITXVIL (protocol), M2MXML (protocol), the COOS Project (an open-source middleware platform), and many others. Additional concepts, such as Universal Gateways, Protocol Converts, Plant Floor Communications, "Smart Grid" applications, and the like are related to the concepts described with respect to the embodiments of this invention.

Various embodiments of this invention propose the concept of grouping (e.g., combining, aggregating, etc.) MTC or M2M devices based on non-access stratus (NAS) signaling.

It is gaining popularity to introduce machine-type communication (MTC) in the current cellular network, which is commonly referred to as machine-to-machine (M2M) communication. This includes the service of metering, roadside security, consumer electronics applications, and the like. It has been agreed in the 3GPP standards organization that the introduction of M2M devices in the cellular network will increase the random access load of the network, thus threatening the random access performance of human-to-human communication devices. The concepts described herein are specifically intended to suggest a method to improve the random access overload by employing so-called "grouping" methods among M2M devices based on non-access stratum (NAS) signaling. The main controlling entity, a so-called mobility management entity (MME), is employed. Also, it is also developed how grouped M2M devices should act to get the uplink (UL) grant after grouping.

It is expected that there is abundant market potential for machine type communication (MTC) services using the currently available (or enhanced or improved) wireless network segments. In particular, it is possible to identify potential applications for mass (large scale) machine-to-machine (M2M) services: for example, consumer products manufacturers (such as automobile manufacturers, etc.) could keep in touch with to their products after they are shipped. Another example is in the home environment, where remote maintenance of heating and air conditioning systems, alarm systems and other applications can also be identified. In addition to such identified applications, it can be expected that if there was an easy to use such M2M services, many more M2M services and applications would be forthcoming.

The current structures (e.g., network equipment, signaling protocols, information processing procedures, etc.) that have been optimally designed for human-to-human (H2H) communication services may be sub-optimal to introduce M2M communication services and therefore particular structures (e.g., network equipment, signaling protocols, information processing procedures, etc.) specifically designed for M2M applications need to be investigated.

Features related to an exemplary network architecture for implementing the concepts described herein will be explained hereafter.

Notation and Key Words:

NAS: Non-Access Stratum, a protocol between user equipment (UE) and an MME (Mobility Management Entity) used in 3GPP.

MTC: Machine-Type Communication(s). Also referred to as Machine-to-Machine (M2M) communication(s).

MTC Device: A UE (or other mobile device) equipped for Machine Type Communication, which communicates through a PLMN with MTC Server(s) and/or other MTC Device(s). The terms "MTC device" and "M2M device" are interchangeably used.

MTC Feature(s): Network functions to optimise the network for use by M2M applications.

MTC Server: A (network) entity, which communicates with the PLMN itself, and with MTC Devices through the PLMN. The MTC Server also has an interface which can to be accessed by an MTC User. The MTC Server performs services for the MTC User.

MTC User: A user who uses the services provided by the MTC Server.

MTC Subscriber: A legal entity (or person) having a contractual relationship with the network operator to provide service to one or more MTC Devices.

Functional Interfaces:

MTCu: Provides MTC Devices access to the 3GPP network for the transport of user plane and control plane traffic. The MTCu interface could be based on Uu, Um, Ww and LTE-Uu interfaces.

MTCi: A reference point that the MTC Server uses to connect with the 3GPP network to thus communicate with MTC Device via 3GPP bearer services/IMS. MTCi could be based on Gi, Sgi, and Wi interfaces.

MTCsms: A reference point that the MTC Server uses to connect with the 3GPP network to thus communicate with MTC Device via 3GPP SMS.

Architecture for Machine Type Communication—3GPP Case:

An end-to-end application, between the MTC device and the MTC server, uses services provided by the 3GPP system. The 3GPP system provides transport and communication services (including 3GPP bearer services, IMS and/or SMS) optimized for Machine-Type Communication (MTC).

The concepts described herein are related to at least one of a plurality of technical standards, which include 3GPP TR 22 (and its sub-sections), TR 23 (and its sub-sections), and TR 37 (and its sub-sections). Such technical documents and their contents are all incorporated by reference herein.

In general, Machine-type nodes (i.e. devices such as mobile phones, sensors, etc.) can be referred to as machine-type communication (MTC) devices or machine-to-machine (M2M) devices. With respect to the radio access network (RAN), the issues related to how random access procedures for many devices need to be performed need to be considered. In the so-called Non-Access Stratum (NAS), signals and information a transferred via a base station (BS), which is also called an evolved Node B (eNB). From the viewpoint of the base station (BS), such signaling is transparent. For network management being performed mainly by a network entity called a Mobility Management Entity (MME), reducing the load in the NAS protocol and in the AS protocol are of concern. For network management being performed mainly based on random access control, access (class) barring, back-off control, admission control (performed at eNB) are of interest. Also, so-called "grouping" (during random access) can be performed. Here, in a so-called "master-slave" relationship among nodes in a network, random access can be performed by a master node. When grouping is employed (as per the embodiments described herein), the random access load may perhaps be reduced substantially.

In some of the various grouping methods provided herein, either the MME or the eNB determines how grouping is to be performed. The grouping types can be divided into Type 1 (1*a* and 1*b*), Type 2 and Type 3, whereby Types 1 and 2 employ MME-based grouping. Type 1*a* can be used for IDLE mode MTC devices (during random access), Type 1*b* can be used for IDLE mode MTC devices (without random access), and Type 2 can be used for CONNECTED mode MTC devices, while Type 3 is the eNB-based grouping method. All of the above concepts will be explained in more detail hereafter.

Figure 1:
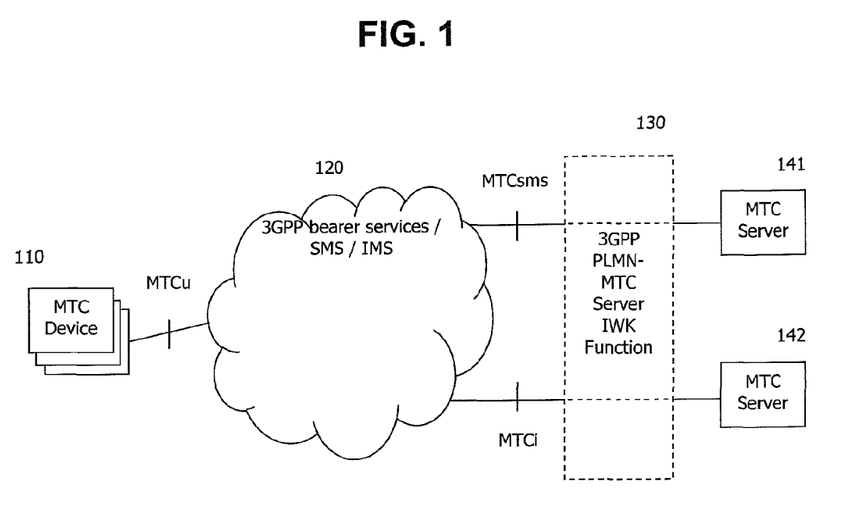
FIG. 1 shows an exemplary service model for Machine-Type Communication (MTC) employing MTC servers.

FIG. 1 shows an exemplary service model for Machine-Type Communication with MTC servers. There is shown a conceptual structure in which an MTC Device (110) connects to the 3GPP network (120) (UTRAN, E-UTRAN, GERAN, I-WLAN, etc.) via the MTCu interface. The MTC Device communicates with a MTC Server or other MTC Devices using the 3GPP bearer services, SMS and/or IMS provided by the PLMN (130). The MTC Server (141, 142) is an entity which connects to the 3GPP network via an MTCi interface and/or an MTCsms interface to thus communicate with MTC Devices. The MTC Server may be an entity outside of the operator domain or inside the operator domain.

Figure 2:
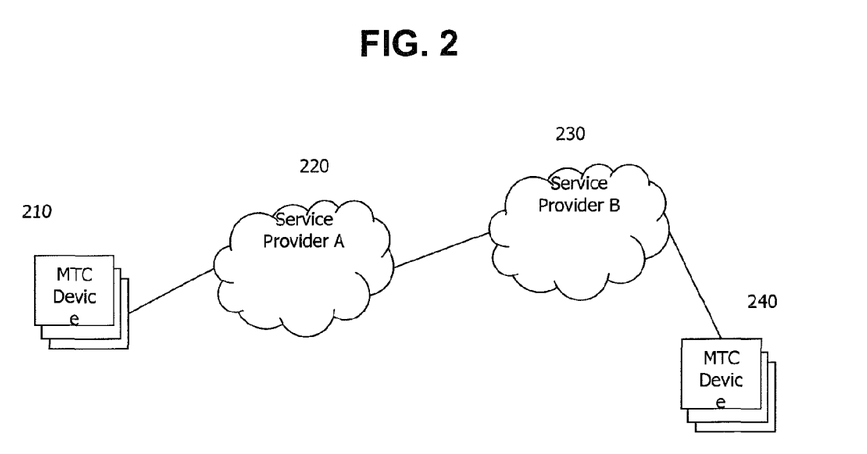
FIG. 2 shows an exemplary service model for Machine-Type Communication (MTC) without employing MTC servers.

FIG. 2 shows an exemplary service model for Machine-Type Communication without MTC servers. Certain MTC devices (210) may be in direct communication with a Service Provider A (220), while other MTC devices (240) may be in direct communication with a Service Provider B (230).

The various concepts described with respect to embodiments of this invention are intended for reducing the random access load from massive (i.e. large scale) MTC devices. In more detail, a grouping method (or other type of method for clustering, bundling, gathering, assembling, combining, etc.) for MTC devices in IDLE mode (ready for Random Access) is provided.

Figure 3:
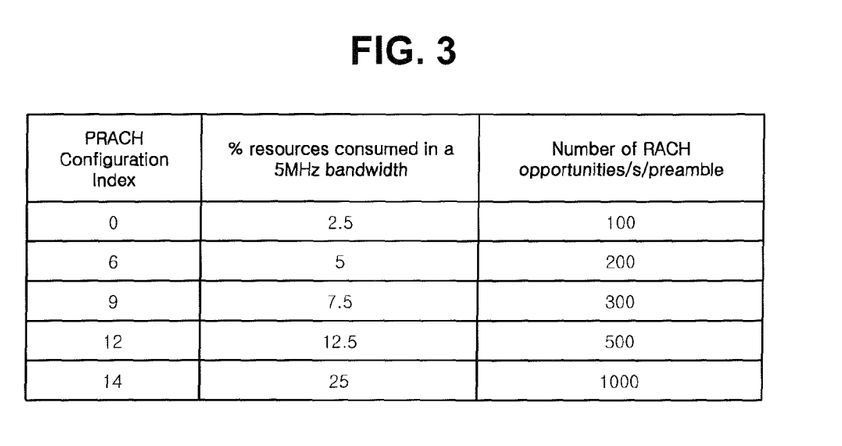
FIG. 3 shows some exemplary numbers of RACH opportunities/s/preamble with respect to certain resources consumes and various PRACH configuration index values.

In the currently available human-to-human (H2H) mobile communication services, the future introduction of M2M communications and services should not impose a huge impact on H2H communications. This includes the protection of the random access success ratio of H2H nodes when M2M nodes are introduced in the current system (or network infrastructure). Because of this requirement, it is necessary to design an improved random access mechanism for M2M nodes in a way not to cause a huge burden to the system. So far it has been discussed that the introduction of M2M nodes for metering purposes, etc., may cause a huge burden to the system during the random access phase, which may result in a large degree of degradation in random access phase signal processing, which may result in a large degree of degradation in random access performance of the H2H nodes. The following table is from the 3GPP discussion, which is agreed within 3GPP:

FIG. 3 shows a table containing entries for the number of RACH opportunities/s/Preamble with respect to each PRACH configuration index and the percentage of resources consumed in a 5 MHz bandwidth. As shown in the table, it is apparent that the random access load from a massive cluster of MTC devices is expected to be very large. Therefore, it would be advantageous to devise an overload protection mechanism against the heavy load from the cluster of MTC devices. Exemplary details regarding a solution to the above-identified problem will be explained.

Figure 4:
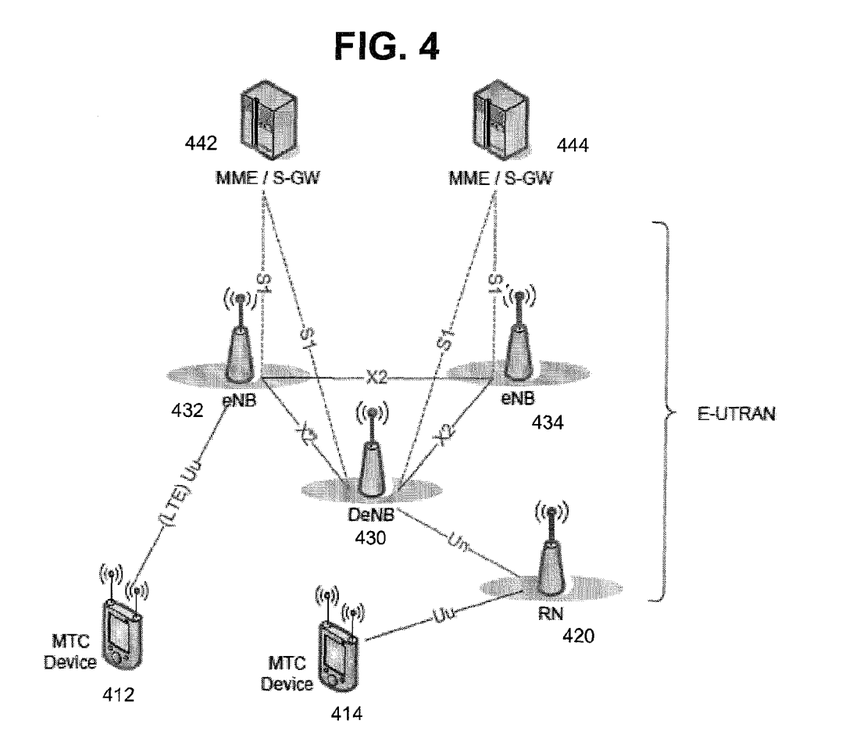
FIG. 4 shows an exemplary overall network structure supporting MTC services.

FIG. 4 shows an exemplary network architecture that is applicable for implementing such solution that supports MTC services. The E-UTRAN consists of eNBs (430, 432, 434), which provide the E-UTRA user plane and control plane protocol terminations towards the UE or MTC Device (412, 414). The eNBs are interconnected with each other by means of the so-called X2 interface. The eNBs are also connected by means of the so-called S1 interface to the EPC (Evolved Packet Core), more specifically to the MME (Mobility Management Entity: 442, 444) by means of the S1-MME and to the Serving Gateway (S-GW: 442, 444) by means of the S1-U. The S1 interface supports a many-to-many relationship between MMEs/Serving Gateways and eNBs. The Un interface supports the connection between a so-called Donor eNB (DeNB) and a Relay Node (RN: 420), whereas the Uu interface supports the connection between the RN and UE (MTC Device).

Hereafter, various types of grouping schemes for MTC devices will be proposed. First, there is a grouping method based on the Mobility Management Entity (MME), which will be referred to as Type 1. Here, such Type 1 method can be divided into two specific schemes, which will be referred to as Type 1*a* and Type 1*b*.

Figure 5:
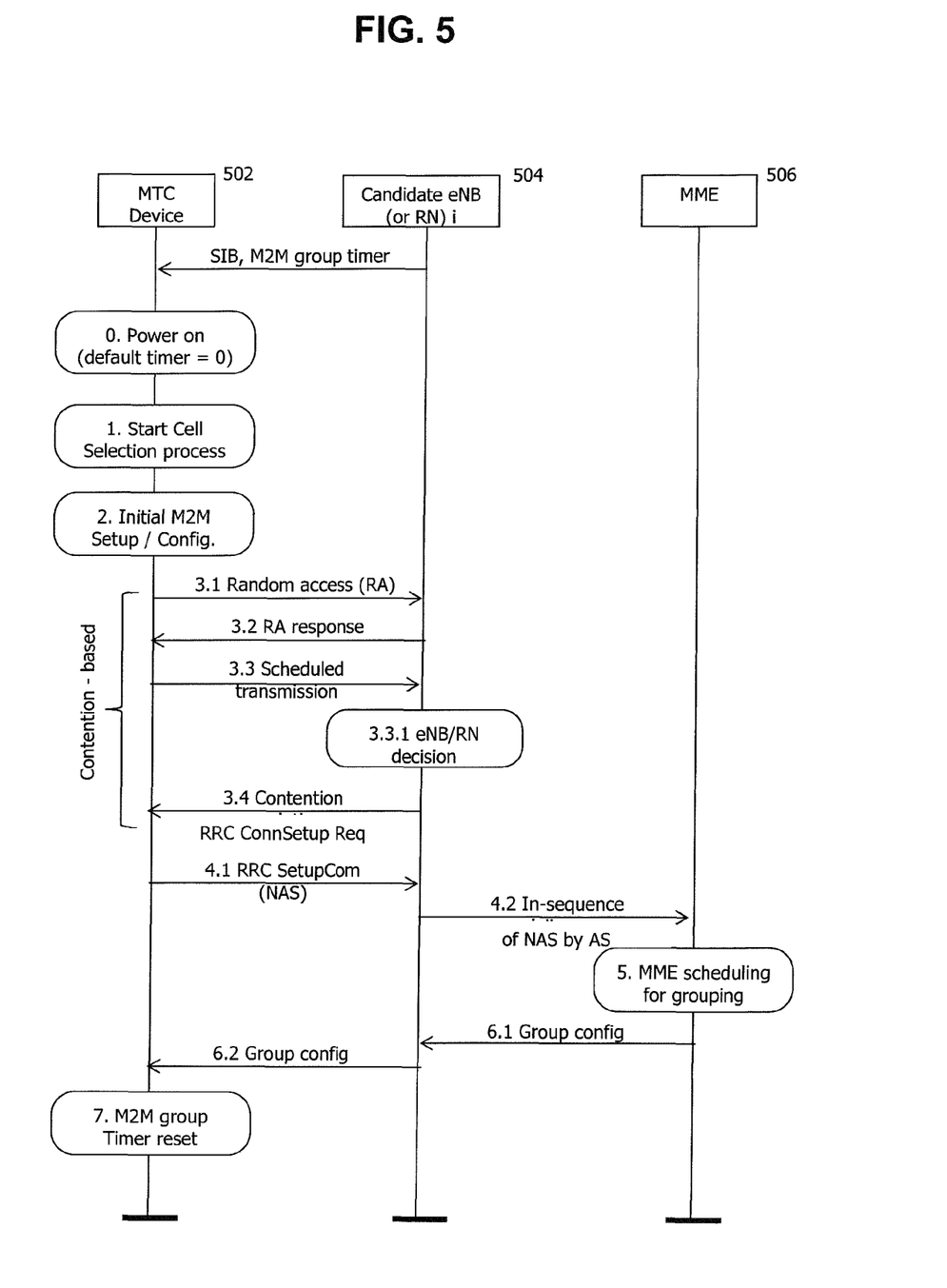
FIG. 5 shows an exemplary signal flowchart for MW-based grouping and distribution (Type 1a method).

FIG. 5 illustrates this Type 1*a* procedure. Type 1*a* can be used for newly MTC (M2M) devices that are newly activated or newly attached to a certain eNB (or RN). Various signaling and processing steps are performed between an MTC Device (502), a Candidate eNB (or RN) (504) and an MME (506).

First, the Candidate eNB (504) can send a System Information Block (SIB) and information related to an M2M (or MTC) group timer to the MTC device (502).

Step 0: MTC device (node) powers on (i.e. becomes activated, etc.). Whenever an MTC device powers on, it shall follow the next procedures.

Step 1: MTC device starts a cell selection procedure. The cell selection procedure is performed and the current mode of the MTC device becomes "IDLE mode".

Step 1.1: If there is nothing to send or if the MTC device is not paged, the MTC device camps on the best cell (i.e. the first priority cell) based on measurements.

Step 1.2: Otherwise, it follows the next procedure to enter "CONNECTED mode".

Step 2: MTC device starts setup; starts reading SIB information to get initial system information (SI) in preparation for random access (RA).

Step 3: (Contains the following sub-steps)

Step 3.1: MTC device starts Stage 1 of RA.

Step 3.2: MTC device performs Stage 2 of RA in response to the response message from eNB (or RN).

Step 3.3: MTC device starts Stage 3 of RA; sends "scheduled transmission".

Step 3.3.1: eNB or RN makes decision: accept or not (access control).

Step 3.4: MTC device starts Stage 4 of RA in response to the message from eNB (or RN), receives RRCConnectionSetupRequest message.

Step 4: (Contains the following sub-steps)

Step 4.1: MTC device sends RRCConnectionSetupComplete message (via NAS) to the eNB (or RN).

Step 4.2: eNB or RN makes in-sequence delivery of MTC device's NAS (without knowing the payload contents) to MME.

Step 5: The MME decides upon group configuration, namely which nodes (slave or secondary) to belong to which node (master or principal), in response to those RRCConnectionSetupComplete messages received from one or more MTC devices.

Here, it may be noted that the MME's decision can be event-driven or periodic: MME decides when one or a predetermined number of RRCConnectionSetupComplete messages arrive in the "even-driven" method, whereas MME decides/updates when timer is expires in "periodic" method. The MME scheduling algorithm depends on how implementation is carried out.

Step 6: MME sends M2Mgroup configuration message(s) to the selected principal and optionally to the other M2M devices.

Step 7: eNB or RN should get the M2Mgroup configuration message(s) relayed to the designated receiver(s).

Figure 6:
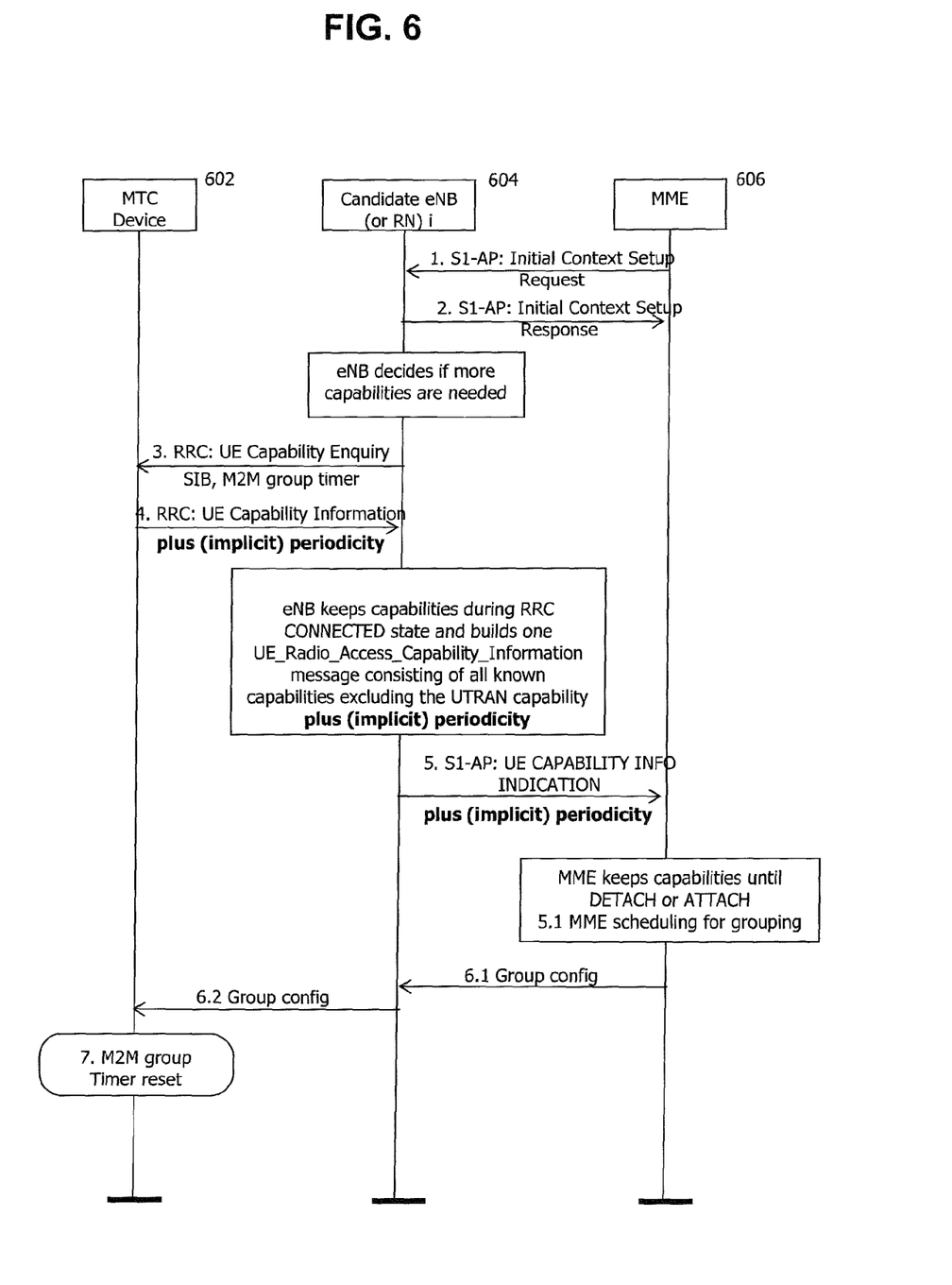
FIG. 6 shows an exemplary signal flowchart for MME-based grouping and distribution (Type 1b method—without random access).

FIG. 6 illustrates the Type 1*b* procedure for MME based grouping and distribution without random access. Various signaling and processing steps are performed between an MTC Device (602), a Candidate eNB (or RN) (604) and an MME (606). Type 1*b* can be used for M2M (MTC) devices that are newly activated or newly attached to a certain eNB (or RN). The difference of this method from the Type 1*a* is that Type 1*b* is not based on Random Access. Instead, this Type 1B method utilizes the "UE capability" inquiry procedure, which is currently defined in 3GPP standard, Release-8.

All steps in Type 1*b* are basically the same as those in Type 1*a*. However, in Step 4, the MTC device sends additional information to eNB so that the eNB can transfer that information to MME (Step 5). Then the MME can make use of that information for scheduling for grouping of MTC devices (in Step 5.1).

Figure 7:
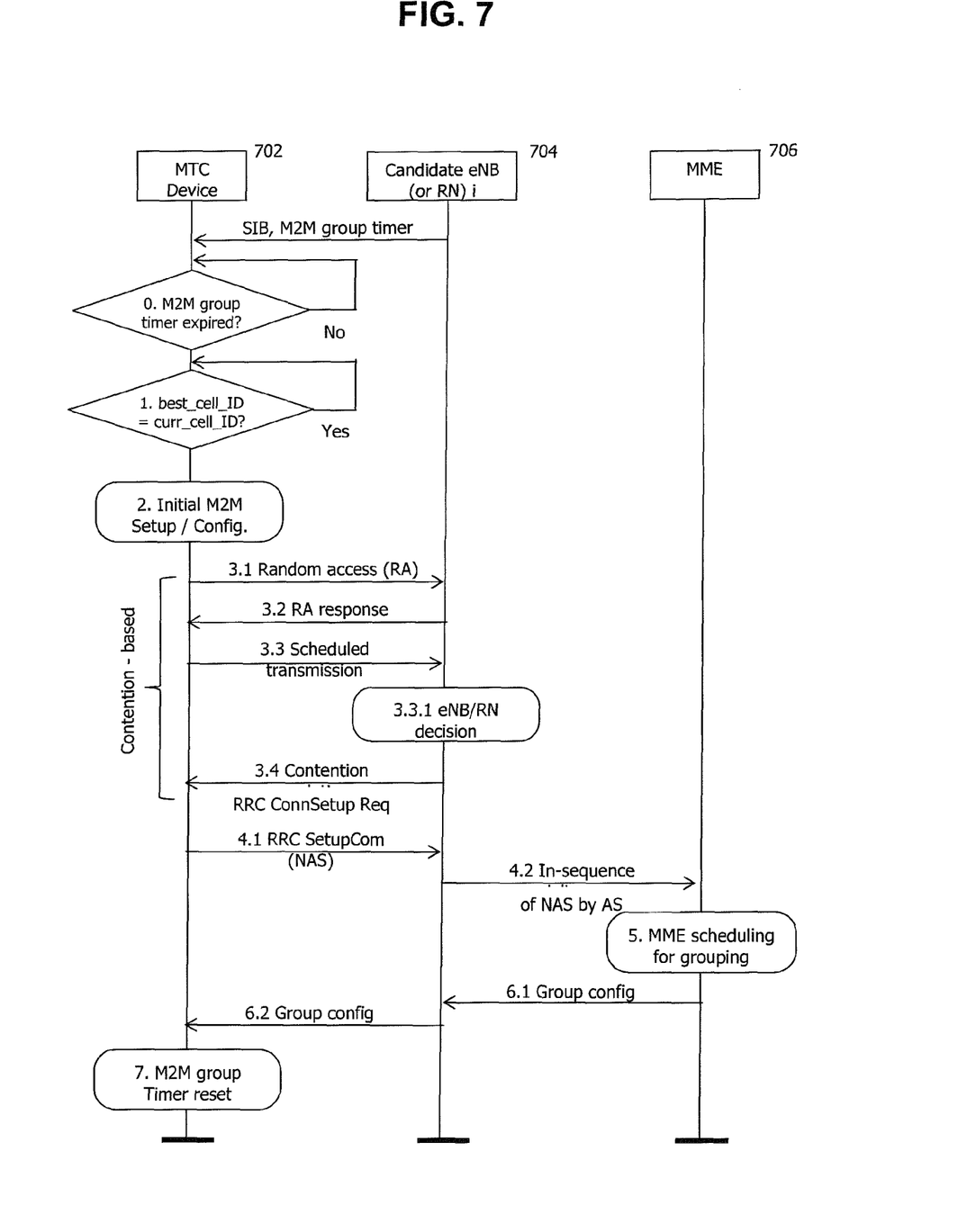
FIG. 7 shows an exemplary signal flowchart for MME-based grouping and distribution (Type 2 method).

FIG. 7 illustrates the Type 2 procedure for the MME based grouping method. Various signaling and processing steps are performed between an MTC Device (702), a Candidate eNB (or RN) (704) and an MME (706). This Type 2 method can be used for MTC devices which are in "CONNECTED mode". Since MTC devices are assumed in 3GPP to have no or very low mobility and have mostly infrequent data to transmit, they can stay in CONNECTED mode for a certain period of time even though they do not have data to transmit at that certain point of time. However, for this type of time period, it is possible that a certain node/device has moved or detached from its originally attached eNB (or RN), which may result in possible changes in topology and therefore a re-setup of the topology might be necessary. Thus, for those MTC devices, this Type 2 method can be used to serve this purpose. It should be noted that M2M devices using the Type 2 method are assumed to be in CONNECTED mode.

First, the Candidate eNB (704) can send a System Information Block (SIB) and information related to a M2M (or MTC) group timer to the MTC device (702).

Step 0: MTC device (node) checks the "M2Mgroup timer". If the M2Mgroup timer expires, it performs the next steps. Otherwise, it does not.

Step 1: MTC device checks the best cell (here, "best cell" includes two meanings: the previous cell and best new cell to be connected to or handed over to). If the best cell is different from the current cell (comparison can be performed based on certain identities or identifiers (ID, RNTI, etc.) or based on system information (SI)), the MTC device shall follow the next steps. Otherwise, it does not.

Step 2: The next steps are the same as those of the Type 1 method.

Hereafter, the particular actions that the MTC (M2M) device may perform will be explained.

First, procedures for periodicity informing are to be performed. Basically, three types of such periodicity information can be considered. In a first (Type A) method, each M2M device shall inform the MME (via eNB or RN) of its period if it has periodicity. The MME shall send the period information to the master (or principal) together with grouping information. In a second (Type B) method, each M2M device shall inform the MME (via eNB or RN) of its (implicit) period if it does not have periodicity. The MME shall send the period information to master (or principal) together with grouping information. In a third (Type C) method, a specific subframe is particularly configured so that each M2M device can randomly access to the master (principal).

Next, the action of a Non-Master MTC device at RA failure needs to be considered. In a first step, the situation of "Missing_count=0" is confirmed. If there is no contention resolution (RA success) after a master's RA attempt, the slave (non-master) MTC device shall: (a) stay on until next cycle comes by keeping the data to go out if the missing_count is less than a threshold number "threshold1"; (i) compress the data if the missing_count is less than a threshold number "threshold2"; and (b) Make its own RA attempt if the missing_count is greater than or equal to a threshold number "threshold2". If the RA attempt is successful, reset of "missing_count=0" is performed.

Furthermore, as a result of implementing the above-described procedure, the possible impact(s) on the Radio Interface (System Information, etc.) need to be considered. There are two main factors, as follows: (1) the group of M2M devices may have a single type, namely, all M2M devices within a particular group are of the same type, and (2) the group of M2M devices may have multiple different types, which may be applicable for implementation with respect to meters, consumer electronics, etc. In particular, (a) the timer information can be set for each type and can be carried through the System Information Block (SIB) or other suitable transfer means. This information can be sent not in every SIB interval, but in every interval of a certain length that is longer than the SIB interval. Also, (b) each group may have Group_ID, Group_Type, and Group_Timer or Group_Type-_Timer.

As described thus far, the so-called MME-based control scheme used to protect massive M2M random access traffic from overloading is a newly conceived concept, not believed to be found in existing technology. In the current MME specification, the MME does not perform any grouping function for end nodes (or devices). However, in the technical details described herein, the MME is involved with grouping of M2M devices, and is also involved with signaling of the necessary information to/from eNB and to/from M2M devices.

Meanwhile, in contrast to the MME-based grouping method described thus far, a different type of solution can also be implemented. Namely, a so-called eNB based (Type 3 Method) is possible.

Figure 8:
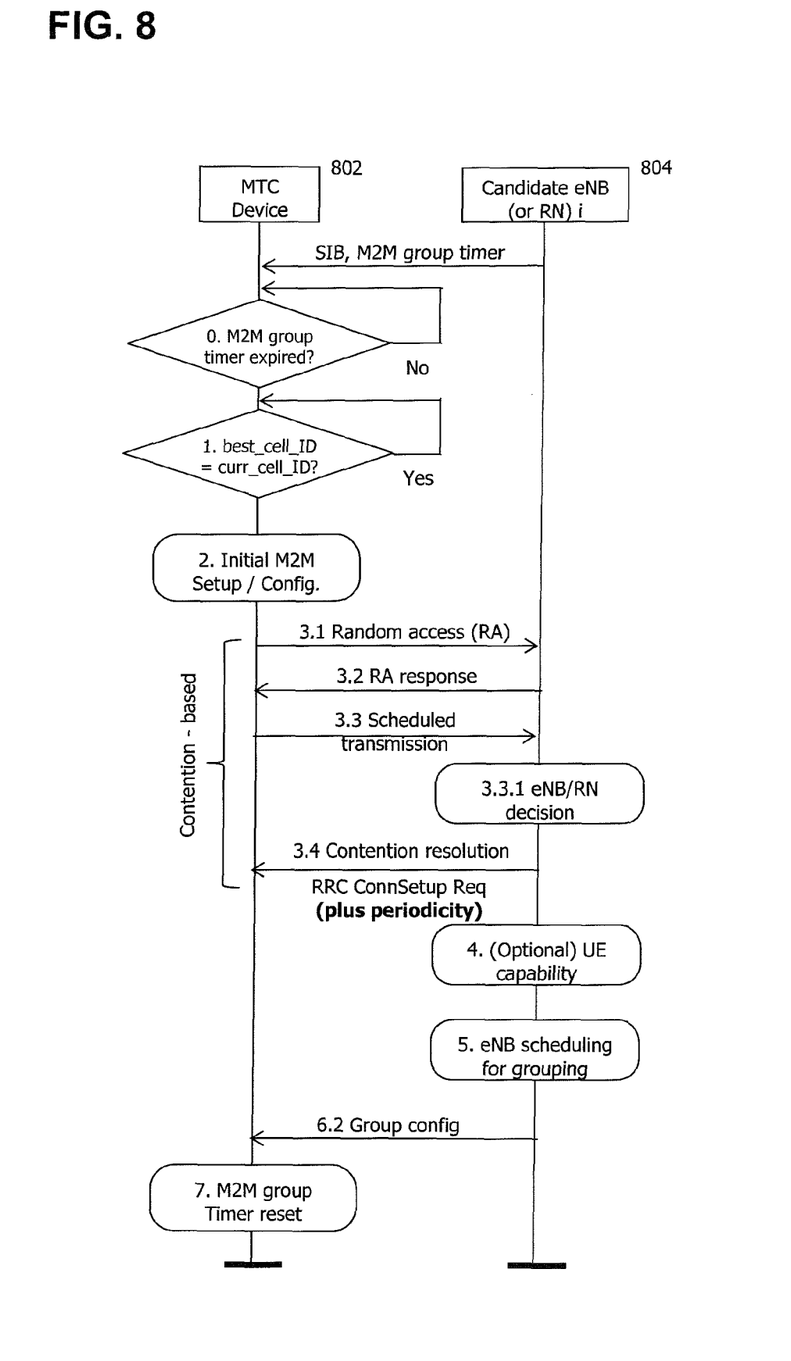
FIG. 8 shows an exemplary signal flowchart for MME-based grouping and distribution (Type 3 method).

FIG. 8 shows an example of an eNB-based grouping and distribution scheme (referred to as a Type 3 method). As shown, non-NAS based approaches are described with respect to the MTC Device (802) and the Candidate eNB or RN (804). The initial steps are equivalent to those for the Type 2 method shown in FIG. 7. Also, in Step 4 of FIG. 8 (Type 3 method), the UE Capability procedure is the same as those in Steps 1 through 5.1 (before 5.1) of FIG. 6 (which is the Release-8 UE Capability inquiry procedure). However, in FIG. 8, either Step 3.4 with "periodicity informing" or Step 4 can be used for the eNB to recognize the information of periodicity of a particular MTC device.

Figure 9:
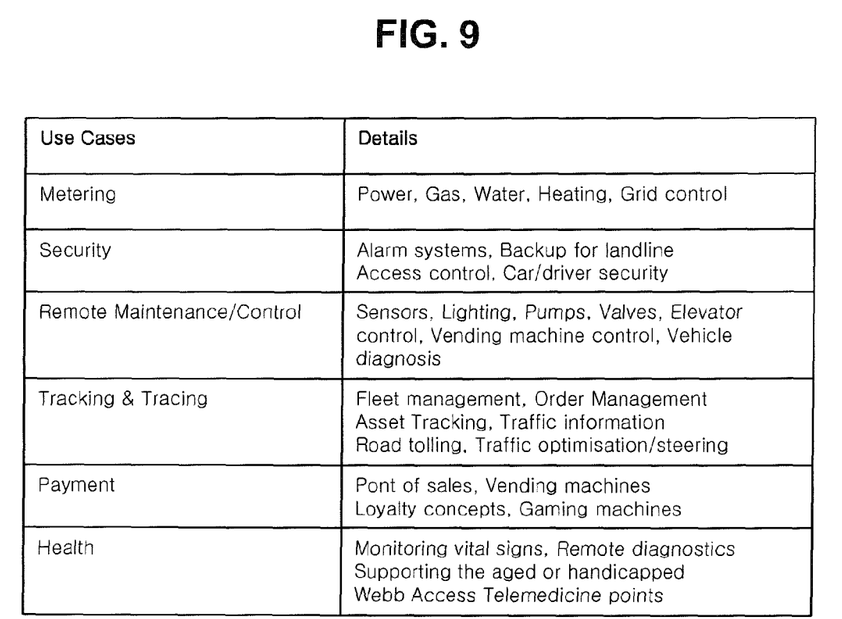
FIG. 9 shows a table with exemplary use cases or practical applications for Machine-Type Communication (MTC).

FIG. 9 shows some possible use cases (i.e. practical applications) that employ the various grouping schemes, methods and procedures described herein.

Only some potential and common applications of M2M technology in the near future of wireless networks will be mentioned hereafter. In particular, the concepts described with respect to various embodiments of the invention can be used to efficiently control the random access request load in mass, large scale M2M services.

First of all, such concepts can be used for so-called "metering," which refers to providing control for power, gas, water, heating, grid control, and industrial or electrical metering. For example, metering devices could be used to monitor energy networks, to provide information on energy consumption and billing, and to improve end-user energy efficiency.

Also, such concepts can be used for so-called "road security," which often refers to an in-vehicle emergency call services that could provide location information and other specific information to assist in handling various kinds of emergency situations. Road security also includes some so-called "smart applications" for ticketing, intelligent traffic management, congestion avoidance and fleet management.

Additionally, such concepts can be used for consumer electronics and devices, which include electronic equipments intended for everyday use and are most often used in communications, entertainment and office productivity. Thus, as can be seen from the above, various types of MTC (M2M) services bear enormous application diversity.

Figure 10:
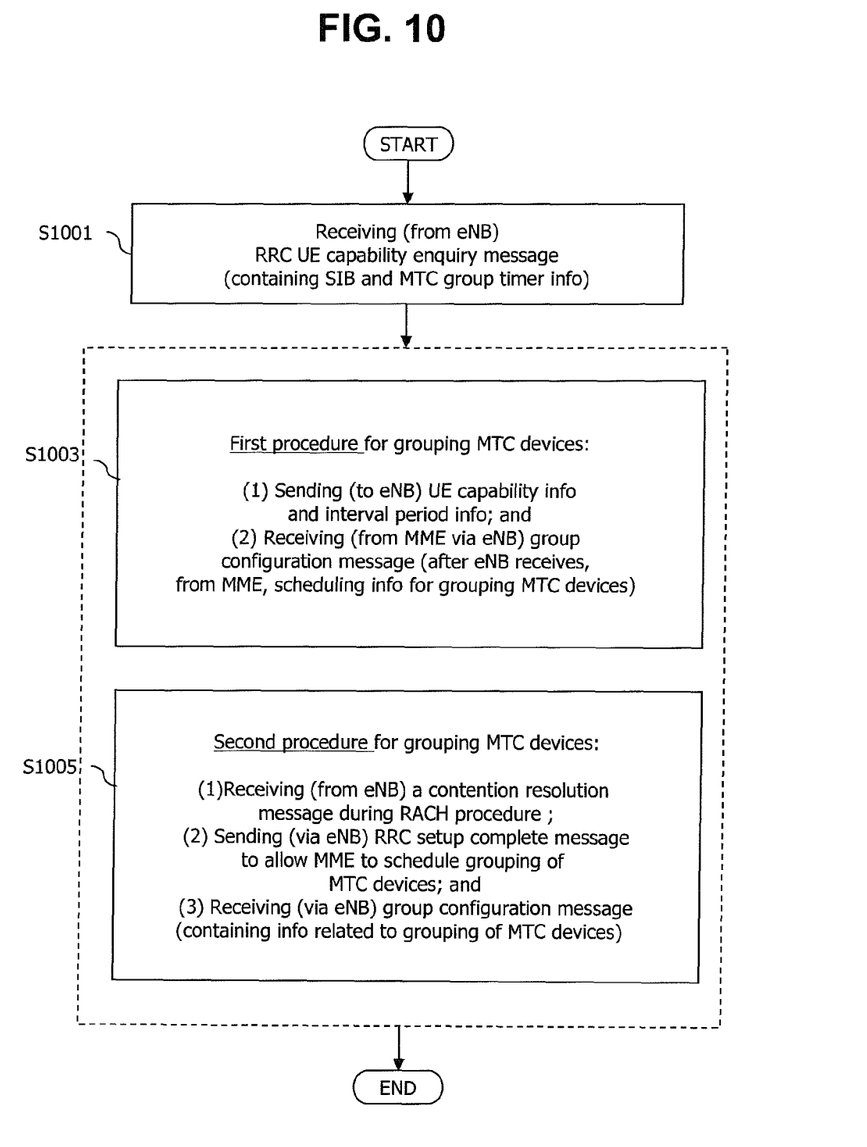
FIG. 10 shows a flowchart of the exemplary procedures for certain embodiments described herein.

To sum up, the various inventive concepts and features of the present disclosure can be described in the following manner:

Referring to FIG. 10, the present disclosure provides a method for machine type communication (MTC) performed by a machine type communication (MTC) device, the method comprising: receiving, from an evolved Node-B (eNB), a radio resource control (RRC) user equipment (UE) capability enquiry message that contains information comprising a system information block (SIB) and information related to a machine type communication (MTC) group timer; and performing a first procedure for grouping machine type communication (MTC) devices, comprising: (=Type 1*b*) sending, to the eNB, UE capability information and interval period information in response to receiving the RRC UE capability enquiry message; and receiving, from an MME via the eNB, a group configuration message after the eNB receives, from the MME, scheduling information for grouping of MTC devices; or performing a second procedure for grouping machine type communication (MTC) devices, comprising: (=Types 3, 1*a*, 2) receiving, from the eNB, a contention resolution message during a random access procedure; sending, via the eNB, a radio resource control (RRC) connection setup complete message to allow the MME to schedule grouping of MTC devices; and receiving, via the eNB, a group configuration message that contains information related to grouping of MTC devices.

Here, the first procedure (=Type 1*b*) for grouping MTC devices is MME based grouping, and the second procedure for grouping MTC devices is random access based grouping. For the first procedure, the group configuration message is transparent to the eNB and is received via a downlink shared channel. For the second procedure (=Type 3), the contention resolution message includes interval period information, and the group configuration message is determined by the eNB and received from the eNB. For the second procedure (=Type 1*a*), the group configuration message is received after the eNB receives such from an MME that performs scheduling for grouping of MTC devices. The RRC connection setup complete message is sent to the MME via the eNB. The group configuration message is determined by the MME and received from the MME via the eNB. For the second procedure (=Type 2), the MTC device is in RRC_CONNECTED MODE before the random access procedure when a serving cell and a best cell are different, wherein the best cell is a cell to which the MTC device is to be connected to or handed over to. Also, after the random access procedure is performed to the best cell, the group configuration message is received after the eNB receives from an MME that performs scheduling for grouping of MTC devices.

Additionally, the present disclosure also provides a method for machine type communication (MTC) performed by an evolved Node-B (eNB), the method comprising: sending, to a machine type communication (MTC) device, a radio resource control (RRC) user equipment (UE) capability enquiry message that contains information comprising a system information block (SIB) and information related to a machine type communication (MTC) group timer; and performing a first procedure for grouping machine type communication (MTC) devices, comprising: (=Type 1*b*) receiving, from the MTC device, UE capability information and interval period information in response to sending the RRC UE capability enquiry message; and sending, to the MTC device, a group configuration message after receiving, from a mobility management entity (MME), scheduling information for grouping of MTC devices; or performing a second procedure for grouping machine type communication (MTC) devices, comprising: (=Types 3, 1*a*, 2) sending, to the MTC device, a contention resolution message during a random access procedure; receiving, from the MTC device, a radio resource control (RRC) connection setup complete message to allow the mobility management entity (MME) to schedule grouping of MTC devices; and sending, to the MTC device, a group configuration message that contains information related to grouping of MTC devices.

Here, the first procedure for grouping MTC devices is MME based grouping, and the second procedure for grouping MTC devices is random access based grouping. For the second procedure (=Type 3), the contention resolution message includes interval period information and the group configuration message is determined by the eNB. For the second procedure (=Type 1*a*), the group configuration message is sent to the MTC device after the eNB receives such from an MME that performs scheduling for grouping of MTC devices, wherein the RRC connection setup complete message is sent to the MME via the eNB, and wherein the group configuration message is determined by the MME and received from the MME. For the second procedure (=Type 2), the MTC device is in RRC_CONNECTED MODE before the random access procedure when a serving cell and a best cell are different, wherein the best cell is a cell to which the MTC device is to be connected to or handed over to, and wherein after the random access procedure is performed to the best cell, the group configuration message is sent to the MTC device after the eNB receives from an MME that performs scheduling for grouping of MTC devices.

Furthermore, the present disclosure also provides a method for machine type communication (MTC) performed by a mobility management entity (MME), the method comprising: performing a first procedure for grouping machine type communication (MTC) devices, comprising: (=Type 1*b*) sending, to an evolved Node-B (eNB), an initial context setup request message; receiving, from the eNB, an initial context setup response message in response to the sent initial context setup request message; receiving, from the eNB that cooperates with a plurality of machine type communication (MTC) devices, UE capability information and periodicity information related to the MTC devices; maintaining the UE capability information received from the eNB until the MTC devices detach from or attach with the eNB; performing MME scheduling for grouping of the MTC devices based on the UE capability information received from the eNB; and sending, to the MTC devices via the eNB, a group configuration message that contains information related to the grouping of the MTC devices; or performing a second procedure for grouping machine type communication (MTC) devices, comprising: (=Types 1*a*, 2) receiving, from the eNB, in-sequence delivery of NAS based on contention resolution performed between the eNB and at least one MTC device during a random access procedure; performing MME scheduling for grouping of MTC devices based on the in-sequence delivery of NAS received from the eNB; and sending, to the at least one MTC device via the eNB, a group configuration message that contains information related to the grouping of MTC devices.

In the first procedure, all steps are performed without performing a random access procedure, and all steps are performed for MTC devices that are newly activated or newly attached to the eNB. In the second procedure, the step of performing MME scheduling involves making a decision about which slave or secondary nodes belong to which master or principal nodes based on RRC connection setup complete messages that the eNB received from the MTC devices, and the decision is based on an event-driven method or a periodic method.

Finally, the present disclosure also provides an apparatus (e.g., device having appropriate hardware components such as a processing unit, controller, CPU, microprocessor(s), memory or storage, etc. that access and execute corresponding software code) that is able to implement and carry out the above-described methods for grouping MTC or M2M devices based on non-access stratus (NAS) signaling.

The various features and concepts described herein may be implemented in software, hardware, or a combination thereof. For example, a computer program (that is executed by a processor, controller, CPU, etc. in a computer, a mobile terminal and/or a network device) that implements a method and apparatus for grouping MTC or M2M devices based on non-access stratus (NAS) signaling may be comprised of one or more program code sections or modules for performing various tasks. Similarly, a software tool (that is executed by a processor, controller, CPU, etc. in a computer, a mobile terminal and/or a network device) for a method and apparatus for grouping MTC or M2M devices based on non-access stratus (NAS) signaling may comprise program code sections or modules that are executed by a processor (or other controller such as a CPU) for performing various tasks.

The method and apparatus for grouping MTC or M2M devices based on non-access stratus (NAS) signaling are compatible with various types of technologies and standards. Certain concepts described herein are related to particular standards, such as 3GPP (LTE, LTE-Advanced, etc.), IEEE, 4G, GSM, WCDMA, and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support MTC (M2M) communications and services.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

What is claimed is:

1. A method for machine type communication (MTC) performed by a machine type communication (MTC) device, the method comprising:
    receiving, by the MTC device which is connected with an evolved Node-B (eNB), a radio resource control (RRC) user equipment (UE) capability enquiry message including a system information block (SIB) and information related to a machine type communication (MTC) group timer;
    if the MTC device is set as a master device:
        sending a random access message when the MTC group timer is expired and the eNB connected with the MTC device is different from a best cell which is determined based on a group type of the MTC device and the SIB, and
        receiving, from the eNB, a contention resolution message in response to the random access message when a random access procedure according to the random access message is successfully performed; and
    if the MTC device is set as a slave device:
        keeping data when the random access procedure of the master device has failed and a missing count is less than a first threshold value,
        compressing the data when the random access procedure of the master device has failed and the missing count is less than a second threshold number and greater than the first threshold value, and
        sending the random access message when the random access procedure of the master device has failed and the missing count is greater than or equal to the second threshold value.

2. The method of claim 1, wherein the contention resolution message includes interval period information.

3. The method of claim 1, further comprising:
    receiving, from a Mobility Management Entity (MME) via the eNB, a group configuration message that contains group type information and group type timer information after the random access procedure is successfully performed.

4. The method of claim 3, wherein the group configuration message is received after the eNB receives such from the MME.

5. The method of claim 3, further comprising:
    sending, via the eNB, a radio resource control (RRC) connection setup complete message to allow the MME to schedule a grouping of MTC devices.

6. The method of claim 4, wherein the group configuration message is determined by the MME and received from the MME via the eNB.

7. The method of claim 3,
    wherein the MTC device is in a $RRC_{13}$ CONNECTED MODE before the random access procedure when a serving cell and a best cell are different, and
    wherein the best cell is a cell to which the MTC device is to be connected to or handed over to.

8. The method of claim 7, wherein after the random access procedure is performed to the best cell, the group configuration message is received after the eNB receives schedule information from the MME.

9. A machine type communication (MTC) device for machine type communication, the device comprising:
    a wireless communication unit; and
    a controller configured to:
        receive a radio resource control (RRC) user equipment (UE) capability enquiry message including a system information block (SIB) and information related to a machine type communication (MTC) group timer;
        if the MTC device is set as a master device:
            send a random access message when the MTC group timer is expired and the eNB connected with the MTC device is different from a best cell which is determined based on a group type of the MTC device and the SIB, and
            receive, from the eNB, a contention resolution message in response to the random access message when a random access procedure according to the random access message is successfully performed; and
        if the MTC device is set as a slave device:
            keep data when the random access procedure of the master device has failed and a missing count is less than a first threshold value,
            compress the data when the random access procedure of the master device has failed and the missing count is less than a second threshold number and greater than the first threshold value, and
            send the random access message when the random access procedure of the master device has failed and the missing count is greater than or equal to the second threshold value.

10. The device of claim 9, wherein the contention resolution message includes interval period information.

11. The device of claim 9, wherein the controller is configured to:
   receive, from a Mobility Management Entity (MME) via the eNB, a group configuration message that contains group type information and group type timer information after the random access procedure is successfully performed.

12. The device of claim 11, wherein the group configuration message is received after the eNB receives such from the MME.

13. The device of claim 12, wherein the controller is configured to:
   sending, via the eNB, a radio resource control (RRC) connection setup complete message to allow the MME to schedule a grouping of MTC devices.

14. The device of claim 11, wherein the group configuration message is determined by the MME and received from the MME via the eNB.

15. The device of claim 11, wherein the MTC device is in a $RRC_{13}$ CONNECTED MODE before the random access procedure when a serving cell and a best cell are different, and
   wherein the best cell is a cell to which the MTC device is to be connected to or handed over to.

16. The device of claim 15, wherein after the random access procedure is performed to the best cell, the group configuration message is received after the eNB receives schedule information from the MME.

* * * * *